(12) United States Patent
Vriheas et al.

(10) Patent No.: US 8,297,498 B2
(45) Date of Patent: Oct. 30, 2012

(54) AUTOMATED SUBMISSION OF PREPAID PROGRAMS

(75) Inventors: Carrie Vriheas, San Francisco, CA (US); Elizabeth Boone Luzader, Austin, TX (US); William Moody, San Francisco, CA (US); Sandy Lee Belshe, San Jose, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 889 days.

(21) Appl. No.: 12/211,716

(22) Filed: Sep. 16, 2008

(65) Prior Publication Data

US 2009/0084842 A1    Apr. 2, 2009

Related U.S. Application Data

(60) Provisional application No. 60/976,215, filed on Sep. 28, 2007.

(51) Int. Cl.
*G06Q 40/00* (2012.01)
(52) U.S. Cl. ....................................... 235/379
(58) Field of Classification Search ............... 235/379, 235/380; 705/38, 39
See application file for complete search history.

(56) References Cited

U.S. PATENT DOCUMENTS

| 6,505,176 | B2 * | 1/2003 | DeFrancesco et al. | 705/38 |
| 6,615,190 | B1 * | 9/2003 | Slater | 705/41 |
| 6,752,313 | B1 * | 6/2004 | Caviles et al. | 235/375 |
| 7,096,198 | B1 | 8/2006 | Cuervo | |
| 2003/0078864 | A1 | 4/2003 | Hardesty et al. | |
| 2006/0120519 | A1 | 6/2006 | Tamari et al. | |
| 2006/0265335 | A1 | 11/2006 | Hogan et al. | |

FOREIGN PATENT DOCUMENTS

KR    10-2000-0036868    7/2000

OTHER PUBLICATIONS

International Search Report and Written Opinion dated Apr. 9, 2009 for PCT/US2008/076697.
International Preliminary Report on Patentability dated Mar. 30, 2010 for PCT/US2008/076697.

* cited by examiner

*Primary Examiner* — Jamara Franklin
(74) *Attorney, Agent, or Firm* — Chadbourne & Parke LLP; Walter G. Hanchuk

(57) ABSTRACT

A payment system includes transaction handler that processes transactions, each characterized by a consumer and a merchant engaging in a sales transaction involving a prepaid program having prepaid cards, such as a gift card, that an issuer provides to consumers. A method for establishing a prepaid program includes the issuer remotely accessing a computer system at the transaction handler. The computer system presenting the issuer with a program information form on which the issuer enters requested data. As each data item is entered, the computer system checks for errors, which are identified to and corrected by the issuer in real time. The issuer submits the data as a request to create a prepaid program, which the transaction handler reviews and responds by approving or rejecting creation of the prepaid program. The transaction handler electronically communicates approval or rejection of the prepaid program to the issuer.

32 Claims, 3 Drawing Sheets

PREPAID PROGRAM
INFORMATION SUBMISSION

☐ CREATE A NEW SUBMISSION

☐ ACCESS A STORED INFORMATION FORM

☐ CHECK STATUS OF A PREVIOUS SUBMISSION (PREVIOUS) (NEXT) (EXIT)

PROGRAM INFORMATION FORM  PAGE 1

MEMBER INFORMATION

ISSUER OR SPONSORING MEMBER NAME [ ]
LOCAL ADDRESS [ ]
CITY [ ]  STATE [ ]  ZIP CODE [ ]

SPONSORED MEMBER [ ]
LOCAL ADDRESS [ ]
CITY [ ]  STATE [ ]  ZIP CODE [ ]

SUBMITTER [ ]  EMAIL: [ ]

(PREVIOUS) (NEXT) (EXIT)

FIG. 4

PROGRAM INFORMATION FORM  PAGE 2

BUSINESS IDENTIFICATION NUMBER [ ]
BEGINNING ACCOUNT NO. [ ]  ENDING ACCOUNT NO. [ ]

PORTABLE PAYMENT DEVICE TYPE
☐ VISA CARD    ☐ VIRTUAL CARD
☐ PRIVATE LABEL    ☐ PLUS CARD

PROGRAM TYPE
☐ BUXX    ☐ HEALTH SAVINGS ACCOUNT
☐ CONSUMER GIFT    ☐ INCENTIVE HEALTH/WELLNESS
☐ CAMPUS/STUDENT DISBURSEMENT    ☐ TRANSIT/PARKING EMPLOYEE BENEFIT (PREVIOUS) (NEXT) (EXIT)

FIG. 5

AUTOMATED SUBMISSION OF PREPAID PROGRAMS

CROSS-REFERENCE TO RELATED APPLICATIONS

This application claims benefit of U.S. Provisional Patent Application No. 60/976,215, titled Automated Submission of Prepaid Programs, filed on Sep. 28, 2007.

FIELD

The present invention relates to prepaid payment programs, such as debit accounts and gift payment cards, that are sponsored for a program issuer by a transaction handler; and in particular to automated submission of information by the program issuer to the transaction handler for creating a new prepaid payment program.

BACKGROUND

Payment transaction processing systems have been created to enable consumers to pay for products and services at merchants without exchanging money at the time of the purchase. An exemplary transaction processing system 100, depicted in FIG. 1, includes an issuer 104 of a payment account for use by a consumer 102; a transaction handler 106, such as a credit card company; an acquirer 108; and a merchant 110. Payment cards are issued to individual people and to business entities, thus the consumer 102 may be a person to whom the payment card was issued or may be a person having access to the card funds, such as an employee of a business entity to which the payment card was issued. When a payment card is issued, the issuer 104 often provides a portable payment device 112 for use by the consumer 102. Examples of portable payment devices include a credit or debit card, a gift card, a smartcard, a smart media, a payroll card, a health care card, a wrist band, a machine readable medium containing account information, a keychain device such as the SPEEDPASS® commercially available from ExxonMobil Corporation or a supermarket discount card, a cellular phone, personal digital assistant, a pager, a security card, a computer, an access card, a wireless terminal, a contactless sticker or a transponder. The portable payment device 112 may have a volatile or non-volatile memory to store information such as the card number or an cardholder's name.

A typical transaction begins with the consumer 102 presenting an card that has a number, such as through the use of a computer terminal or a portable payment device 112, to the merchant 110 to pay for the purchase of a product or service. The merchant 110 may utilize a Point of Service (POS) terminal 114 to obtain a payment card number from the portable payment device 112. The portable payment device 112 may interface with the POS terminal using a mechanism including any suitable electrical, magnetic, or optical interfacing system. The POS terminal 114 is in operative communication with the transaction processing system 100 and can communicate with the acquirer 108, the transaction handler 106, or the issuer 104. For a usual purchase transaction, the POS terminal sends a transaction authorization request to the issuer 104 of the portable payment device 112. Alternatively, or in combination, the portable payment device 112 may communicate with the issuer 104, the transaction handler 106, or the acquirer 108.

The issuer 104 responds by authorizing or denying the transaction authorization request using the transaction handler 106. Authorization includes the issuer 104, or the transaction handler 106 on behalf of the issuer 104, authorizing the purchase transaction in compliance with the issuer's 104 instructions, such as through the use of business rules. A message indicating authorization or denial of the transaction authorization request is sent back through the transaction handler 106 to the merchant 110. The transaction handler 106 may maintain a log or history of authorized transactions. Once approved, the merchant 110 records the authorization and delivers the product or service to the consumer 102.

The merchant 110 may, at discrete periods, such as the end of the day, submit a list of authorized transactions to the acquirer 108 or other components of the transaction processing system 100. The transaction handler 106 may compare the submitted authorized transaction list with its own log of authorized transactions. If a match is found, the transaction handler 106 may route authorization transaction amount requests from the corresponding acquirer 108 to the corresponding issuer 104 involved in each transaction. Once the acquirer 108 receives the payment of the authorized transaction amount from the issuer 104, it can forward the payment to the merchant 110 less any transaction costs, such as fees. If the transaction involves a debit or prepaid card, the acquirer 108 may choose not to wait for the initial payment prior to paying the merchant 110.

There may be intermittent steps in the foregoing process, some of which occur simultaneously. For example, the acquirer 108 can initiate the clearing and settling process, which can result in payment to the acquirer 108 for the amount of the transaction. The acquirer 108 may request from the transaction handler 106 that the transaction be cleared and settled. Clearing includes the exchange of financial information between the issuer 104 and the acquirer 108, and settlement includes the exchange of funds. The transaction handler 106 can provide services in connection with settlement of the transaction. The settlement of a transaction involves an issuer 104 withdrawing an amount of a transaction settlement from a clearinghouse, such as a clearing bank, for deposit into a settlement house, such as a settlement bank. The corresponding acquirer 108 withdraws the amount of the transaction settlement from the settlement bank. Typically, the settlement bank is chosen by the transaction handler 106, and the clearing bank is chosen by the acquirer 108. Thus, a typical transaction involves various entities to request, authorize, and fulfill the processing of the transaction for clearing and settlement.

Some transactions involve a prepaid card in which a given amount of money has been deposited in a card account for use by a consumer. One type of a prepaid program is an employee benefits card, examples of which are a health savings account that is limited to paying for health care related expenses or in which an employer deposits money for use by an employee to pay for specified products and services, such as mass transit fares. There are many types of prepaid cards (gift, travel, youth, general purpose, etc.) that are purchased by a consumer some are might have a pre-defined monetary value like in the case of gift cards ($25, 50, 100) and other will allow the consumer to load a variable amount that can be used to buy products and services, often from any visa merchant.

Unlike cards for a generic credit or debit card, any card accounts related to a prepaid program must first be approved by the transaction handler, which as noted above may be a conventional credit card company, such as Visa, Inc. Heretofore, the establishment of a prepaid program involves an issuer or an agent acting on behalf of an issuer preparing a written application for a new prepaid program. The application required that various specified items of information be provided by the preparer in order to define the type of program and its parameters. In certain programs, a custom portable payment device was issued that included a logo and other information for the particular program or the sponsor of that program. The completed written form and any artwork for the customized portable payment device then submitted electronically to the transaction handler for programs managed by that company. Upon receipt, the submitted materials are routed via electronic means to the proper departments that process the prepaid program applications.

Previously, an agent of an issuer could prepare and submit an application for a prepaid program in the name of the issuer. In many instances, however, the agent was not fully aware of operational guidelines and other restrictions promulgated by the transaction handler for particular types of prepaid programs. In addition, the agent was not always aware of other requirements of the associated issuer. As a consequence, an agent could create a prepaid program on behalf of an issuer even though the nature of the prepaid program conflicted with that issuer's guidelines and restrictions. This presents a need for greater control of the application process for prepaid programs to ensure conformity with the requirements, restrictions, and guidelines.

Upon receiving an application for a prepaid program, the transaction handler reviewed the contents of the application form. If errors or incomplete information were found on the form, the application was returned to the originator for correction. Therefore, at best, the process for creating a new prepaid program could take weeks depending upon the delivery time for each exchange of the written information and the amount of time necessary to ultimately get a properly completed application.

Therefore, it is desirable to improve the process for approving prepaid programs to reduce the amount of time, eliminate many of the common errors in the application, and enable the transaction handler to track the progress of each application through the review process.

SUMMARY

A transaction processing system enables a transaction handler to process business transactions, each characterized by a consumer and a merchant engaging in a sales transaction upon an account that was provided to the consumer by an issuer. Some of the sales transactions involve prepaid cards, such as those like a gift card, for example. The prepaid cards are part of a prepaid program, various types of which have different requirements that have been imposed by law, the issuer, or the transaction handler. Therefore, it is important when a prepaid program is to be created/approved that all the necessary information be provided by the requesting issuer and that the proposed prepaid program complies with the associated requirements.

A method for establishing a prepaid program, having at least one card provided by the issuer, involves the issuer remotely accessing a computer system at the transaction handler. For example, the transaction handler may have an Internet website for this purpose. The computer system presents a program information form to the issuer, which responds by providing data requested on the program information form. In a preferred embodiment, the computer system checks the correctness of the data entered on the form and informs the issuer of any errors. The issuer then can access the previously submitted program information form on-line to correct the erroneous data.

When the issuer has completed the program information form, it is submitted as a request to create a prepaid program. In addition, collateral materials related to a portable payment device to be used and instructional materials for prepaid program may be submitted at the same time for review by the transaction handler. The transaction handler reviews the data and other materials that were submitted and approves or rejects creation of the prepaid program. The transaction handler then electronically communicates approval or rejection of the prepaid program to the issuer.

BRIEF DESCRIPTION OF THE DRAWINGS

Implementations of the invention will become more apparent from the detailed description set forth below when taken in conjunction with the drawings, in which like elements bear like reference numerals.

FIG. 4 portrays a computer screen that displays a portion of a program information form by which a user submits information for creating a prepaid program; and FIG. 5 portrays a computer screen that displays another portion of the program information form.

DESCRIPTION

The present implementations facilitate an automated submission of information for creating a prepaid program from the issuer 104 to the transaction handler 106 through a secure on-line platform. A prepaid program, as used herein, is a program within the transaction processing system 100 which is centered around an card account having a monetary deposit with the issuer 104 that provided the card. Examples of the prepaid cards include: a stored value card, a gift card, a campus/student disbursement program, a health savings account card, an employee health/wellness card, a flexible spending account card, and a transit/parking employee benefit card.

In order to create a new prepaid program, an issuer 104 accesses the secure on-line platform operated by the transaction handler 106, and submits information defining the prepaid program, as well as optional collateral materials related to a portable payment device and instructional materials for that program. The transaction handler 106 reviews that submission and authorizes or denies the new prepaid program. That decision is communicated to the originating issuer.

Figures 1, 3:
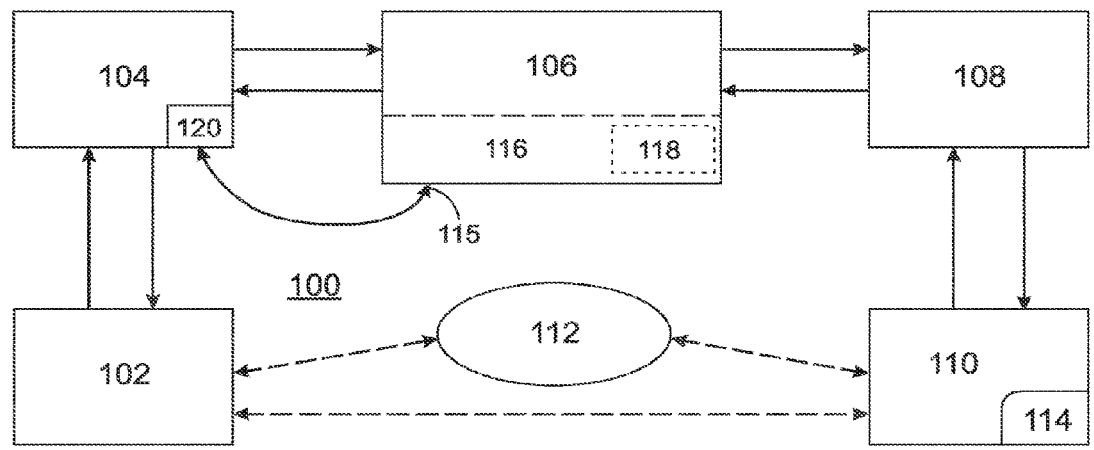
FIG. 1 is a block diagram illustrating an exemplary transaction processing system.
FIG. 3 illustrates an exemplary main menu from which a user accesses different components of the information submission procedure.
Figure 2:
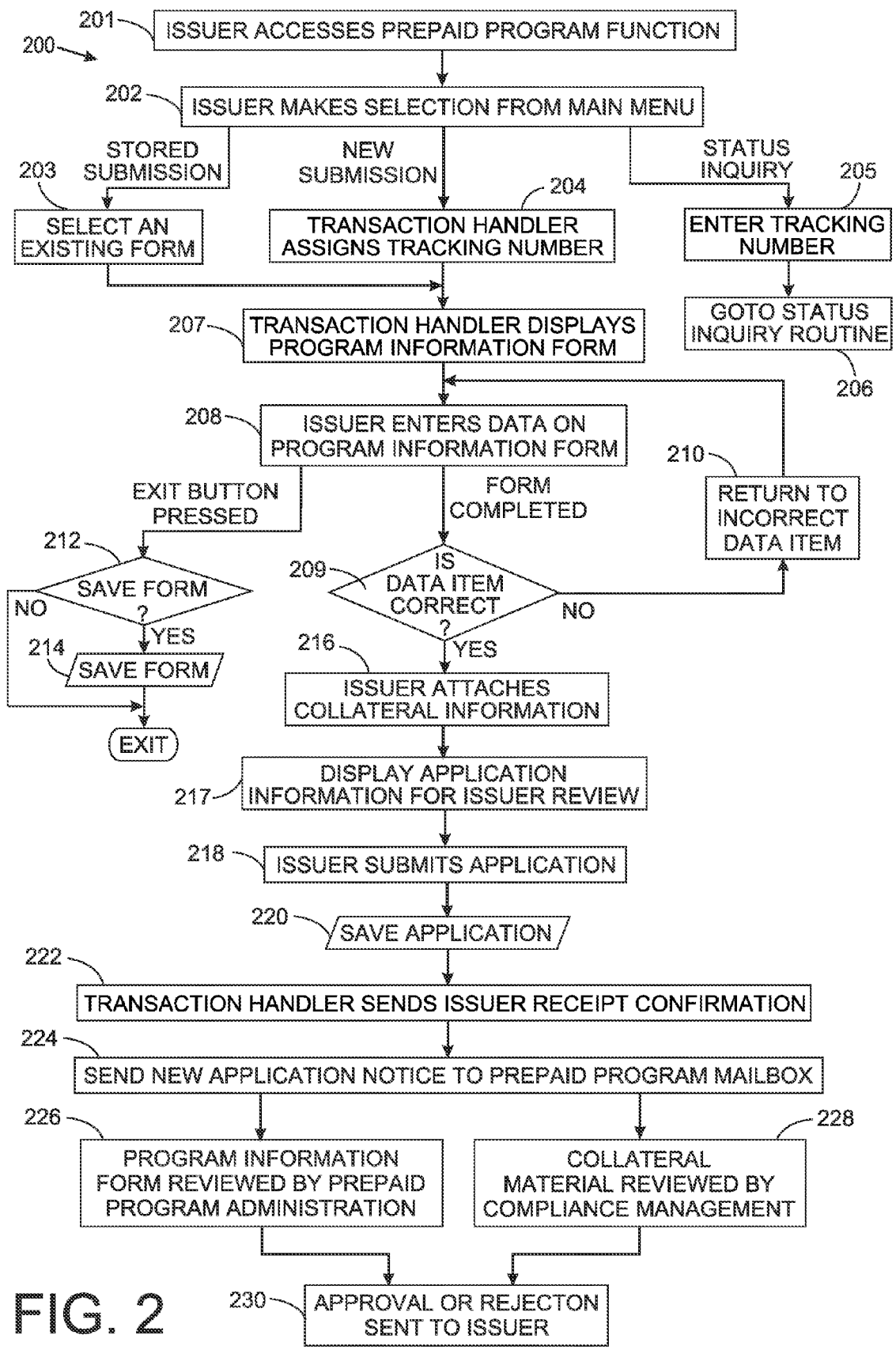
FIG. 2 is a flowchart depicting the on-line process for submitting and reviewing information to create a new prepaid program.

With reference to FIGS. 1 and 2, the process 200 by which a person at the issuer 104 submits information to the transaction handler 106 for creating a new prepaid program commences at step 201 by the issuer accessing a portal 115 of a computer system 116 at the transaction handler 106. In one implementation, the portal includes a website of the transaction handler on the Internet. From the home page of that website, the issuer 104 is able to select the prepaid program function and be connected to that function running on the computer system 116. That access provides a web-enabled graphical user interface (GUI) which is displayed on a personal computer 120 at the issuer 104 using commercially available web browser software. Thus the issuer is not required to have any special software to interface on-line with the prepaid program function at the transaction handler 106.

Alternatively, access to the computer system 116 can be provided by a dial-up telephone connection or other point-to-point communication link.

Regardless of the communication link that is used, once the issuer 104 accesses the computer system 116 at the transaction handler 106, the issuer is asked to enter a user identification and a password, which thereby restricts access to the computer system to only authorized entities. Other types of security measures for restricting access also may be utilized. The transaction handler 106 then compares the user identification and password to sets of such identifiers and passwords stored in a database of authorized entities. If the newly submitted user identifier and password match a set for an authorized entity, the issuer 104 is granted access to the computer system 116 and specifically to the prepaid program function at step 201.

Upon successfully accessing the prepaid program function, the process advances to step 202 at which a main menu is sent to the issuer, where it is displayed on a monitor of the personal computer 120. FIG. 3 depicts a basic example of the main menu which presents three options to the issuer. Those options are to create a new submission, access a previously stored information form or to check the status of a previous submission. The user places a check mark in the box next to the desired item and then clicks the NEXT button to advance to the section of the on-line process for the selected item.

Assume that the issuer 104 desires to create a new submission, the process advances to step 204 where the transaction handler 106 assigns a unique tracking number to this submission. The tracking number enables the submission to be identified and subsequently accessed by entities within the transaction handler 106.

Then at step 207, a program information form is displayed on the issuer's computer monitor. The program information form has a number of blanks that are to be filled in by the issuer at step 208 with information required to create a new prepaid program. An exemplary first page of that program information form (PIF) is illustrated in FIG. 4. On that page, the issuer 104 is asked for its name or the name of the transaction processing system member that is co-sponsoring the proposed prepaid program. Areas are also provided for entering the address of that entity. After entering an item of information on the program information form, the issuer utilizes the mouse to click on another data entry field to enter the next item of data. If the issuer and another member of the payment system are sponsoring the program, then the name and address of that sponsored member is entered on this page of the form. The identity of the person at the issuer submitting this form and that individual's email address also are entered in order that communications related to the submission can be sent to that submitter. Once the first page of the program information form has been completed, the issuer clicks on the NEXT button to advance to the second page of that form which is shown in FIG. 5.

On this next page, the issuer enters information defining the type of prepaid program being created and certain parameters associated with that program. A payment account number within the transaction processing system comprises a business identification number (e.g. 6 digits) that identifies the particular issuer and additional digits (e.g. 10 digits) that identify a consumer account at that issuer. The first item on page 2 requests a business identification number (BIN) for the issuer 104. The next section on the program information form asks for the beginning consumer account number and an ending consumer account number, thereby defining the range of payment account numbers that can be issued for this prepaid program.

In the central part of page 2, the issuer is requested to identify the type of portable payment device that will be issued to users of this account. The exemplary form provides a selection of four different types of cards: a conventional Visa® branded card; a card with a private label for the particular issuer or program sponsor, such as a specific employer for a benefits card for its employees; a virtual card, meaning that an actual card is not issued but the number may be used for e-commerce transactions; or a card for the PLUS® automatic teller machine network. It should be understood that not only can other types of cards be provided on the selection list, but also other types of portable payment devices mentioned previously.

At the bottom of the second page, the issuer 104 is asked to identify the type of prepaid program from among those that are supported by the transaction handler 106. The types of programs on the exemplary program information form in FIG. 5 include a BUXX program for teenagers to make purchases using a debit account, a consumer gift card, and a program for campus/student related disbursements by which college students can purchase items at food establishments, a bookstore, and other merchants on a college campus. Other programs listed are a conventional health savings account which under the laws of the United States allow an individual to make certain purchases of health related products and services with pre-income tax money, an incentive health/wellness account by which an employer encourages its employees to participate in certain healthy activities, and finally a transit/parking employee benefit account in which an employer deposits money to be used for transportation related expenses of its employees. Other types of prepaid programs that could be listed include a debit account, a stored value card, and a flexible spending account. Once all the appropriate information and selections on page 2 of the program information form have been made, the issuer then clicks on the NEXT button to advance to another page of the program information form. Additional pages than those illustrated can be provided for the entry of other data required by either the issuer 104 or the transaction handler 106 in order to establish a prepaid program. The information on the subsequent pages may vary depending upon selections made previously by the issuer, for example, additional information specifically related to the requirements for a campus/student disbursement cards may be different than that required for a health savings account.

If while filling out the program information form, the issuer 104 comes to a point at which the form must be completed at a later time, the issuer can stop the process by clicking on the EXIT button at the bottom of the form page displayed on the personal computer monitor. This action causes the process to branch from step 208 to step 212 at which the issuer is afforded the opportunity to save the partially completed form in a temporary storage section of the memory 118 of the computer system 116 at step 214. This allows the issuer 104 to terminate the present access session and at a later point in time re-access the prepaid program function to complete filling out the program information form. Alternatively, the issuer can exit the process without saving the partially completed form.

To complete a stored program information form, the issuer accesses the prepaid program function at step 201 via the Internet website, as described previously. At step 202, however, the issuer now selects "Access a Stored Information Form" on the main menu in FIG. 3. This causes the process to branch the step 203 where the issuer enters the tracking number of that previously stored form submission. Alternatively, the transaction handler presents a list of previously uncompleted forms that the issuer stored on the computer system and the issuer then selects the desired one. The process then advances to step 207 where the stored form is displayed to the issuer and the data entry resumes.

After completing the program information form, the issuer 104 clicks on a SUBMIT button on the last page of that form to file the document as a request for the transaction handler to create a new prepaid program. At that time, the process depicted in the flow chart of FIG. 2 advances to step 209 at which the entries of the form are checked to determine whether they are correct. In doing so, the transaction handler applies specific rules related to the form completion that have been defined by either the transaction handler 106 or the issuer 104. Certain of these rules are very obvious, for example, an entry in the field for the business identification number contains less than six digits or an alphabetic character, that entry is erroneous as it must contain six numerical digits. The data check also verifies that entry has been made in all of the required fields and that all the necessary item selections have been made. As each item is checked, if it is found to be incorrect, the program execution branches to step 210 where the process returns to the incorrect data item on the program information form in order that the issuer can enter a correct value. An incorrect value can be further indicated by a change in the type of cursor or highlighting the erroneous data field in a different color on the computer monitor. The program execution then waits at step 208 for the issuer to enter the correct data. Thus, obvious errors in the data entered on the program information form are corrected during the issuer's initial submission of the form.

Alternatively the data in one field can be checked immediately when the issuer advances to another field. In that case, the data checking takes place while the issuer 104 is accessing the prepaid program function on the computer system. Thus the program information form is initially checked and many errors rectified before the form is actually filed for review by the transaction handler 106.

As a further alternative, the computer system 116 may check the data on the program information form off-line after the entire application has been submitted. An email then is sent to the submitter at the issuer 104 that identifies any errors requiring correction before the prepaid program application can be processed further. The issuer then responds by again accessing the computer system 116 and the prepaid program function via steps 201-203 to obtain the previously submitted program information form for correction.

When a properly completed form has been found at step 209, the process advances to step 216 at which the issuer is afforded the opportunity to attach collateral information to the submission. Such collateral materials can include artwork for a custom portable payment device (e.g. a debit card), screen shots and other information for a website of the issuer 104 regarding the prepaid program, and printed materials describing the prepaid program that are to be distributed to consumers 102. For example, the collateral materials may include instructions about limitations on the use of a prepaid program account, such as a health savings account, the use of which is limited by law to certain types of medical products and services. Collateral materials can also include other items that the transaction handler 106 must approve prior to establishing the prepaid program, such as use of a trademark of the transaction handler. A conventional procedure is employed by which the issuer gathers the related documents from its computer network and uploads copies of those documents into the computer system 116 at the transaction handler 106 where the documents are associated with the previously completed program information form.

At step 217, the entries on the program information form and a list of attached collateral materials are displayed for final review by the issuer 104.

Next the completed program information form and the collateral information, if any, are formally submitted as an application for a new prepaid program at step 218. The transaction handler 106 responds by saving the application in a data file on the computer system 116 designated to receive those submissions. Then at step 222, the transaction handler 106 sends the issuer a screen display confirming that the new prepaid program application has been successfully received and listing the specific items that were submitted. In addition, the transaction handler 106 sends a separate confirmation email message to the submitter at the email address that was entered on page 1 of the program information form, shown in FIG. 4.

The items submitted as the prepaid program application are sent to a special mailbox within the transaction handler 106 at step 224. Depositing a submission in that mailbox automatically notifies personnel at the transaction handler that another application has been received for further processing.

The new prepaid program application has two components, the program information form and the collateral materials, which may be reviewed by different departments within the transaction handler 106. Thus at step 226, the program information form is reviewed on-line via the computer system by the prepaid program administration to determine whether it is complete and complies with general program rules established by the transaction handler and any rules promulgated by the issuer that submitted the form. If the program information form complies with the respective rules for the requested type of prepaid program, the prepaid program administration establishes the prepaid program for the issuer. The prepaid program administration then files an approval indication at step 230 in the computer stored record for this application. In addition, the collateral information that was submitted with the application has to be approved by the program compliance management at step 228. This operation determines whether the artwork for the portable program device is acceptable and whether the other materials to be used in conjunction with that program also are acceptable. For example, each time a health savings account is issued, the associated consumer must be presented with materials informing them of the procedures and restrictions for that account. Therefore, those instructional materials must be reviewed and approved by the transaction handler at step 228. The on-line review of such collateral materials can occur simultaneously with the review of the program information form at step 228 or the collateral materials can be reviewed after the program information form has been found to be acceptable. After both the program information form and the collateral material have been approved or rejected at steps 226 and 228, the issuer is informed of those determinations by an email sent to the submitter at step 230. If everything is approved, the process for establishing a prepaid program is completed.

The submission of the program information data via an online form as described above enables each item of data to be automatically transferred into the appropriate prepaid program files in the transaction handler's computer system 116. In contrast, the previous method in which a written form was mailed or faxed to the transaction handler 106 required that the individual items of information be manually entered into the computer system at the transaction handler which could introduce errors into that data. Thus the current system eliminates several potential places where errors may occur.

After filing an application for a prepaid program, the issuer 104 can access the computer system 116 of the transaction handler 106 to learn the status of that application. To do so at step 202 where the main menu in FIG. 3 is being displayed, the issuer selects the final menu item, causing the process to branch to step 205 at which the issuer is requested to enter the tracking number of the respective application. Then the process advances to step 206 where the computer system 116 accesses the file for that application and specifically reads the contents of a field therein that indicates the status. That status field is updated at various points during the application review process. For example, initially the status field merely indicates that the program information form and other submitted materials have been received by the transaction handler 106. At different steps during the approval process as specific submitted items are approved or rejected, indications of those determinations are provided by changing the contents of the status field accordingly. Thus at step 206, the present contents of the status field are used to formulate an application status message which is transmitted back through the internet to the issuer 104.

The preferred embodiment of the present technique for establishing a prepaid program offers several advantages over the previous procedure. Included are limiting submission of a proposal for a prepaid program to only an issuer which has been assigned a user identifier and password to access the computer system at the transaction handler. The technique also detects many types of errors while the issuer is filling out the program information form online and allows the issuer to correct the errors before submitting the form for review. Because the application data are submitted electronically, it can be transferred directly into the data files for the prepaid program that is created thereby eliminating data conversion errors. The online technique also enables enhanced tracking of the submission for a new prepaid program.

The steps of the process described in connection with the implementations disclosed herein may be embodied directly in hardware, in a software module executed by a processor, or in a combination of the two. The various steps or acts in the process may be performed in the order shown, or may be performed in another order. Additionally, one or more process steps may be omitted or one or more steps may be added to the process.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. For a transaction processing system in which a transaction handler processes a plurality of sales transactions, each characterized by a consumer and a merchant engaging in a sales transaction upon an account that was provided to the consumer by an issuer, a method for establishing a prepaid program having at least one card provided by the issuer, the method comprising:
   receiving from an issuer remotely accessing a computer system at a transaction handler a request to establish a prepaid program;
   requesting information about the prepaid program and associated prepaid program parameters from the issuer;
   receiving the requested information from the issuer;
   reviewing the received information for compliance with rules associated with the prepaid program;
   approving or rejecting the prepaid program based on the review; and
   electronically communicating approval or rejection of the prepaid program to the issuer.

2. The method as recited in claim 1, wherein remotely accessing a computer system involves accessing an Internet website of the transaction handler.

3. The method as recited in claim 1, wherein providing the information comprises identifying an entity that remotely accessed the computer system and specifying a type of prepaid program desired to be established.

4. The method as recited in claim 3, wherein the specifying a type of prepaid program comprises indicating one of, a stored value card, a gift card, consumer gift program, a campus/student disbursement program, a health savings account, an employee health/wellness card, a flexible spending account program, and a transit/parking employee benefit card program.

5. The method as recited in claim 1, wherein providing the information comprises specifying a type of portable payment device to be issued for cards in the prepaid program.

6. The method as recited in claim 1, wherein communicating approval or rejection of the prepaid program utilizes the computer system.

7. The method as recited in claim 1, further comprising the computer system checking correctness of the information provided.

8. The method as recited in claim 7, further comprising the computer system notifying an entity that remotely accessed the computer system of incorrect information that was provided; and affording the entity an opportunity to rectify the incorrect information.

9. The method as recited in claim 1, further comprising electronically transferring the information provided into a record at the transaction handler for a prepaid program that is established.

10. The method as recited in claim 1, further comprising an entity that remotely accessed the computer system electronically transferring to the transaction handler collateral materials that are to be used with the prepaid program.

11. The method as recited in claim 10, further comprising the transaction handler reviewing acceptability of the collateral materials against a predefined set of business rules; and notifying the entity whether the collateral materials are acceptable to use.

12. The method as recited in claim 10 wherein the collateral materials comprise one or more of artwork for a portable payment device, artwork for an Internet website, works of authorship regarding the prepaid program, and an item that a rule of the prepaid program requires the transaction handler to approve prior to use of the item.

13. For a transaction processing system in which a transaction handler processes a plurality of sales transactions, each characterized by a consumer and a merchant engaging in a sales transaction upon an account that was provided to the consumer by an issuer, a method for approving a prepaid program having at least one debit account provided by the issuer, the method performed by the transaction handler comprising:
   providing a computer system with a portal that is remotely accessible by an issuer;
   presenting a program information form to the issuer via the computer system;
   receiving data including a selection of a prepaid program and associated prepaid program parameters that the issuer enters on the program information form;

receiving an indication from the issuer that entry of data is complete;

reviewing the data submitted by the issuer for compliance with rules associated with the prepaid program; and in response thereto approving or rejecting the prepaid program based on the review; and electronically communicating approval or rejection of the prepaid program to the issuer.

14. The method as recited in claim 13, wherein the portal comprises a website on the Internet.

15. The method as recited in claim 13, wherein receiving data comprises receiving data that identifies the issuer and specifies a type of prepaid program desired to be established.

16. The method as recited in claim 15, wherein the data that specifies a type of prepaid program indicates one of, a stored value card program, a gift card program, a campus/student disbursement program, a health savings account, an employee health/wellness card program, a flexible spending account program, and a transit/parking employee benefit card program.

17. The method as recited in claim 13, wherein receiving data comprises receiving data specifying a type of portable payment device desired to be issued for cards in the prepaid program.

18. The method as recited in claim 13, wherein electronically communicating approval or rejection of the prepaid program utilizes the Internet.

19. The method as recited in claim 13, wherein receiving data comprises the computer system checking correctness of the data while the issuer is accessing the portal.

20. The method as recited in claim 19 further comprising the computer system notifying the issuer of incorrect data.

21. The method as recited in claim 13, further comprising electronically transferring the data submitted by the issuer into a record at the transaction handler for a prepaid program that is created.

22. The method as recited in claim 13, further comprising the issuer electronically transferring to the transaction handler collateral materials that are to be used with the prepaid program.

23. The method as recited in claim 22, further comprising the transaction handler employing a predefined set of business rules to review acceptability of the collateral materials; and notifying the issuer whether the collateral materials are acceptable to use.

24. The method as recited in claim 22, wherein the collateral materials comprise one or more of artwork for a portable payment device, artwork for an Internet website, works of authorship regarding the prepaid program, and an item that a rule of the prepaid program requires the transaction handler to approve prior to use of the item.

25. A computer readable medium comprising instructions which, when read by a computer, perform the method recited in claim 13.

26. In a transaction processing system in which a transaction handler processes a plurality of sales transactions, each characterized by a consumer and a merchant engaging in a sales transaction upon a card that was provided to the consumer by an issuer, an apparatus for processing a request to approve a prepaid program comprising:

a portal of a computer system that is accessible by an issuer at a remote location;

a data gatherer connected to the portal and which presents a program information form to the issuer and receives data including a selection of a prepaid program and associated prepaid program parameters that the issuer enters on the program information form;

a storage device coupled to the data gatherer for storing the data received from the issuer;

a decision mechanism that determines, based on the data received from the issuer and compliance rules associated with the prepaid program, whether the prepaid program is approved or rejected; and a communicator for electronically notifying the issuer of approval or rejection of the prepaid program.

27. The apparatus as recited in claim 26, further comprising a data checker that reviews the data received from the issuer for correctness, and notifies the issuer of incorrect data.

28. The apparatus as recited in claim 26, wherein the data gatherer also receives, from the issuer, at least one of artwork for a portable payment device, artwork for an Internet website, a work of authorship to be used with the prepaid program.

29. The apparatus as recited in claim 26, wherein the portal comprises an Internet website.

30. The apparatus as recited in claim 26, wherein the program information form requests an identification of the issuer and an indication of a type of prepaid program desired to be established.

31. The apparatus as recited in claim 26, wherein the program information form requests an indication of a type of portable payment device to be issued for accounts in the prepaid program.

32. The apparatus as recited in claim 26, further comprising a data transfer system coupled to the storage device for electronically transferring the data submitted by the issuer into a record for the prepaid program that is established.

* * * * *